(12) United States Patent
Farhan et al.

(10) Patent No.: US 6,417,949 B1
(45) Date of Patent: Jul. 9, 2002

(54) BROADBAND COMMUNICATION SYSTEM FOR EFFICIENTLY TRANSMITTING BROADBAND SIGNALS

(75) Inventors: Forrest M. Farhan, Alpharetta; Paul E. Quesenberry, Marietta, both of GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/434,267

(22) Filed: Nov. 5, 1999

(51) Int. Cl.[7] .............................................. H04B 10/12
(52) U.S. Cl. ...................... 359/173; 359/154; 359/180; 359/181; 359/184; 341/50; 341/110; 375/242; 375/243; 375/245; 375/254; 375/259; 375/295; 375/316
(58) Field of Search ................................. 359/180, 181, 359/173, 184, 154; 341/504, 110; 375/242, 245, 259, 295, 316, 243, 254

(56) References Cited

U.S. PATENT DOCUMENTS

| | | | | |
|---|---|---|---|---|
| 4,393,516 A | * | 7/1983 | Itani | 455/608 |
| 4,763,317 A | | 8/1988 | Lehman et al. | 370/58 |
| 4,924,223 A | * | 5/1990 | Okamoto | 341/95 |
| 5,544,161 A | | 8/1996 | Bigham et al. | 370/58.1 |
| 5,640,159 A | | 6/1997 | Furian et al. | 341/51 |
| 5,644,622 A | | 7/1997 | Russell et al. | 455/422 |
| 5,790,523 A | | 8/1998 | Ritchie, Jr. et al. | 370/241 |
| 5,790,533 A | | 8/1998 | Burke et al. | 370/318 |
| 5,790,705 A | | 8/1998 | Anderson et al. | 382/244 |
| 5,878,325 A | | 3/1999 | Dail | 455/5.1 |
| 5,930,231 A | | 7/1999 | Miller et al. | 370/210 |
| 5,966,636 A | | 10/1999 | Corrigan et al. | 455/4.2 |
| 6,041,056 A | | 3/2000 | Bigham et al. | 370/395 |
| 6,161,011 A | | 12/2000 | Loveless | 455/426 |
| 6,226,296 B1 | * | 5/2001 | Lindsey et al. | 370/401 |
| 6,232,896 B1 | * | 5/2001 | Coene et al. | 341/102 |
| 6,323,793 B1 | | 11/2001 | Howald et al. | 341/137 |

FOREIGN PATENT DOCUMENTS

| | | |
|---|---|---|
| EP | 0 318 311 | 5/1989 |
| WO | WO 91/15927 | 10/1991 |
| WO | WO 98/38800 | 9/1998 |
| WO | WO 98/46025 | 10/1998 |

OTHER PUBLICATIONS

XP–001015206, "A Unified Formulation of Segment Companding Laws and Synthesis of Codecs and Digital Compandors," H. Kaneko, Bell System Technical Journal, Sep. 1970, pp. 1555–1588.

* cited by examiner

Primary Examiner—Leslie Pascal
Assistant Examiner—Hanh Phan
(74) Attorney, Agent, or Firm—Hubert J. Barnhardt, III; Kenneth M. Massaroni; Shelley L. Couturier

(57) ABSTRACT

A broadband communication system (60), such as a cable television system, includes a forward path for transmitting information from headend equipment to subscribers and a reverse path for transmitting information from the subscribers to the headend equipment. The reverse path includes a transmitting station (65) that receives a first analog signal, converts the first analog signal to a first digital signal having a first number of bits, encodes the first digital signal to generate a second digital signal having a second number of bits less than the first number of bits, then optically transmits the second digital signal. A receiving station (70), also located in the reverse path, receives the second digital signal, decodes the second digital signal to generate a third digital signal having a third number of bits greater than the second number of bits, then converts the third digital signal to a second analog signal that approximates the first analog signal.

11 Claims, 2 Drawing Sheets

BROADBAND COMMUNICATION SYSTEM FOR EFFICIENTLY TRANSMITTING BROADBAND SIGNALS

FIELD OF THE INVENTION

This invention applies generally to the transmission of analog signals via sampling and digitization and, more specifically, to broadband transmission applications such as the digitization and transport of broadband system return path signals.

BACKGROUND OF THE INVENTION

In certain instances, it is desirable to represent and transmit a continuously varying electronic waveform, i.e., an analog signal, as a series of discrete binary words, i.e., in a digital representation. These binary words may then be transferred to a receiving location using a suitable transmitter and receiver combination and converted back to an analog format. In the return path of a cable television system, for example, analog information is typically generated by subscribers and received at a nodal station, i.e., a node, as an analog, radio frequency (RF) electrical signal. The analog return path signal can then be converted to serial digital format at the node and transmitted along a fiber optic cable to an optical receiver located at the headend station. At the headend, the digital information is converted back to an analog waveform for processing.

Electronically, an analog-to-digital (A/D) converter at the transmitter converts the continuously-varying input waveform to a series of digital values. A/D converters measure the amplitude of an analog input signal at equally-spaced moments in time, and output lines of the A/D converter are turned on and off to generate a binary number that approximates the measured value. This digital word is transmitted by electro-optical means to a receiving location. Such means commonly include transmission at optical or radio-frequency (RF) wavelengths. At the receiver, a digital-to-analog (D/A) converter inverts the digitizing process to generate an analog waveform from the series of transported binary words.

In an ideal case, the analog signal reconstructed by the receiver D/A converter would be identical to the input of the A/D converter. Unfortunately, the output word size of the transmitter A/D converter is limited to an integral number of bits, M. Since M output bits can only represent $2^M$ discrete values, and since an analog input has an infinite number of amplitude states, there is an unavoidable quantization error associated with the digitization process. In a digital transmission system, the total noise is the sum of the quantization errors and the distortion introduced by the A/D converter and the D/A converter.

In prior art communication systems, quantization errors could be minimized by increasing the resolutions of the A/D and D/A converters to generate and transmit digital words having a greater number of bits. In such a situation, though, the communication channel will quickly become "clogged" unless greater numbers of channels are provided, such as by installing more communication cables, which is a very expensive undertaking. Because each communication channel, or medium, can only transmit a given amount of information within a given time frame, transmission of digital words having greater numbers of bits is prohibitively expensive, and thus impractical, in current communication systems. Alternatively, more expensive lasers and photodiodes could be used to send bits at higher data rates, but this option is also much more expensive than permitted in current systems. Furthermore, bandwidth limitations of the communication channel could still create problems associated with transmission of even the higher data rate signals by the more expensive lasers and photodiodes.

To overcome this problem, greater resolution A/D converters can be used to generate digital words having greater numbers of bits, then the digital words can be truncated. For example, the output of a 12-bit A/D converter could be truncated to an 8-bit size required by the transmitter by throwing away (truncating) the last four bits of the A/D converter output. Truncation or any other method of reducing the number of bits representing the sample, however, always increases the quantization error for one or more possible amplitudes in the analog input range. As a result, the dynamic range and performance of many digital transmission systems are predominantly limited by the width of their transport channels, not by the digitization and reconstruction processes.

In order to improve the dynamic performance of channel limited communications systems, an improved method for decreasing word length is desired.

DESCRIPTION OF THE PREFERRED EMBODIMENT

Figure 1:
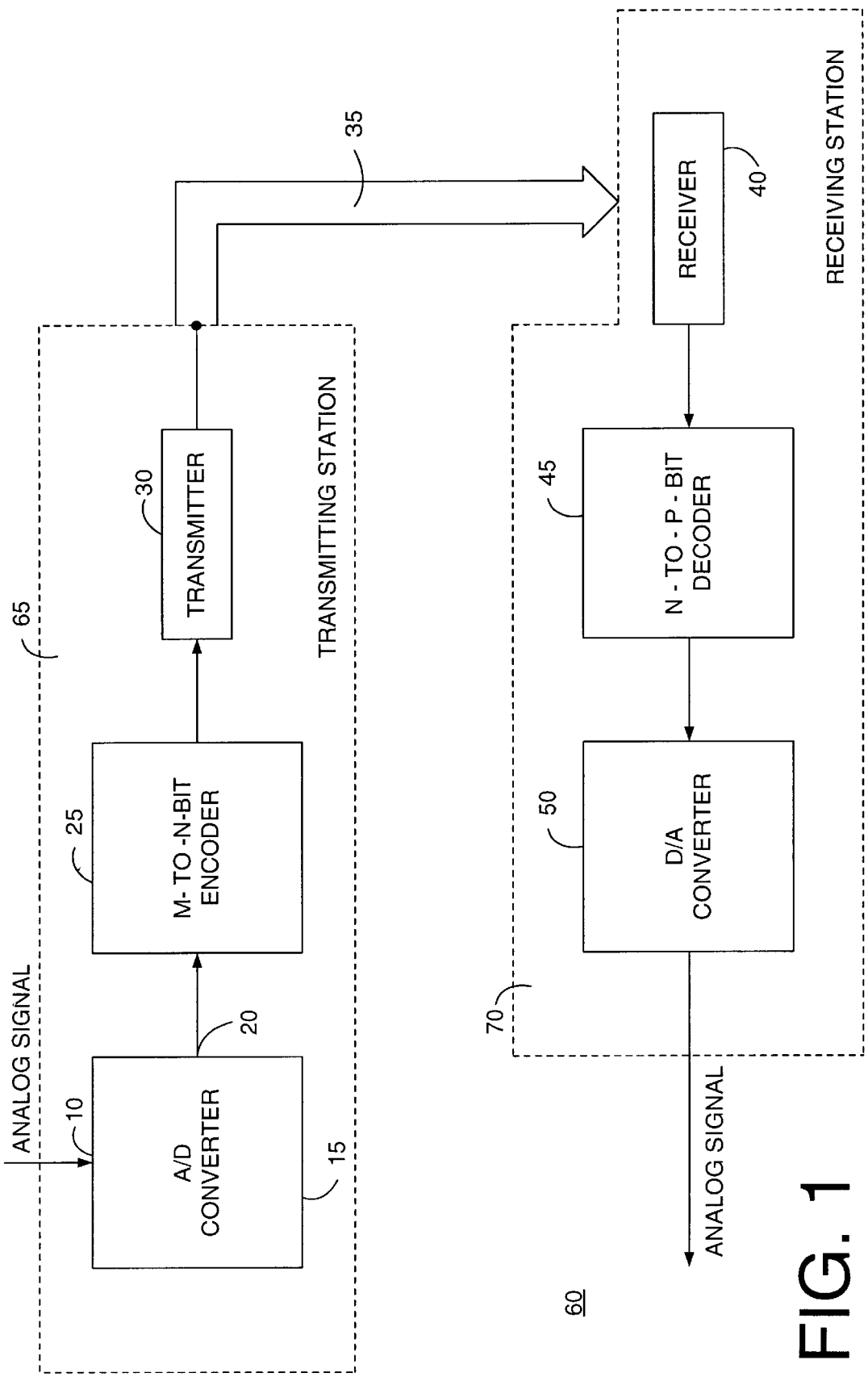
FIG. 1 is a block diagram illustrating the components of a digital transmission system according to the present invention with uniform quantization.

In many applications, analog information is transported to a remote location by the steps of analog-to-digital conversion, digital transmission, and digital-to-analog conversion. In an ideal transport system, the analog signal reconstructed at the receiving station would differ from the original signal only by gain and/or bias constant(s). Actual transport systems, however, such as broadband communication systems, introduce noise and distortion that make the replica signal differ from the original signal. Characterization of the dynamic range, or dynamic performance, of the system reveals how much and in what ways the original and replica signals differ.

One factor that reduces the dynamic performance of certain systems is the quantization error. A digital word containing M bits can only represent $2^M$ discrete values. When the analog signal has a value that falls between the discrete representations there is a quantization error for the corresponding sample, and the quantization error is equal to the difference between the actual signal value and its digital representation.

The most common method of digitizing a signal is called uniform quantization and results in a maximum quantization error that is inversely proportional to $2^M$. That is, the more bits used to represent each sample, the smaller the maximum quantization error. If a system digitizes to M bits, transports M bits, and reconstructs M bits, then the dynamic performance of the system will be predominantly limited by the quantization errors and distortion introduced by the analog-to-digital (A/D) converter and digital-to-analog (D/A) converter.

The distortion introduced by the A/D and D/A converters can be reduced by using greater resolution converters, especially since higher resolution converters can be commercially obtained at relatively low costs. In conventional communication systems, however, the digital signals generated by the higher resolution A/D converters cannot be efficiently or quickly transmitted over existing communication channels that are often already over crowded.

For this reason, conventional transmitters often employ a high resolution A/D converter, then truncate the generated digital signal by discarding the least significant bits (LSBs) of the digital word until the desired smaller number of bits is left. For example, if a signal is digitized using 12 bits per sample, but the digital transport channel can only accommodate only 8 bits per sample, the 4 least significant bits can be thrown away to truncate to 8 bits before transport.

Truncation, or any other method of reducing the number of bits representing sample values, increases the quantization error for one or more possible amplitudes in the analog input range. As a result, the bandwidth of the transport channel, not the digitization and reconstruction processes, predominantly limits the dynamic range and performance of the system. Systems of this type are referred to as channel-limited systems.

According to the present invention, the dynamic performance of a channel-limited communications system can be significantly improved if bits are removed from the digitized input signal according to an encoding map. If the probability amplitude function for the input signal is not uniform, distributing the error so that frequently transmitted values, i.e., those with large amplitude probabilities, have small quantization errors, and rarely transported values, i.e., those with small amplitude probabilities, have large errors will reduce the RMS value of the quantization error. A minimum RMS value is achieved by properly tailoring the characteristics of the encoding map to the amplitude probability function of the input signal, i.e., matching the encoding map to the input signal.

FIG. 1 is a block schematic diagram of an improved transmission system 60 embodying the present invention. In this system 60, a transmitting station 65, which may, for example, comprise a headend, a hub, or a node, receives a continuously varying analog signal at an input 10. The input 10 is coupled to an A/D converter 15 having a uniform quantization error. The A/D converter 15 converts the analog signal to a series of M-bit digital words, which are provided at an output 20 of the converter 15.

The M-bit output of the A/D converter 15 is reduced in size to N bits ('re-quantized') by an the M-to-N-bit encoder 25. The specifics of the re-quantization process are determined by an internal encoding map, stored in a memory of the transmitting station 65, that reduces the re-quantization error for frequently-transmitted amplitudes and increases the re-quantization error for rarely transmitted values.

The N-bit output signal of the encoder 25 is transmitted in a conventional manner using an N-bit transport channel 35 that couples a conventional digital transmitter 30 to a conventional digital receiver 40 within the receiving station 70. In an optical transmission system 60, for example, the transmitter can comprise a modulated laser source, and the transport medium can be implemented by a single-mode optical fiber.

The receiving station 70 can be, for instance, a headend, a hub, or a node within a broadband communication system that processes optical signals. The digital receiver 40 of the receiving station 70 preferably uses an optical detector to convert the modulated lightwave signal to a series of N-bit digital words, which are processed by an N-to-P-bit decoder 45 to re-quantize the receiver output, thereby increasing the word size from N bits to P bits. The details of the re-quantization are determined by a decoding map, which can be stored within memory of the decoder 45 or within a separate conventional memory device of the receiving station 70. A D/A converter 50 reconstructs the analog signal from the digital output of the N-to-P-bit decoder 45.

The dynamic performance of this system is determined, to a large degree, by the features of the encoding and decoding maps. Maps that reduce the re-quantization error for frequently transmitted amplitudes will provide improved performance in accordance with the present invention.

The noise power ratio, NPR, measurement is one method for quantifying the dynamic performance of a broadband communication and transport system. Depending on the definition of the encoding and decoding maps of the transmitting station 65 and receiving station 70, respectively, it is possible to enhance the height and/or width of different portions of the NPR curve.

The performance of an encoding map that is designed to increase the width of the NPR curve at value of 40 dB, for example, can be compared to that of a system in which word length was reduced using a conventional truncation technique. A system supporting 8-bit transport was considered, and ideal converters with 10-bit and 12-bit output word lengths were used to digitize the input signal at a rate of $10^6$ samples per second. The energized input spectrum was 0–40 MHz, with a notch centered at 25 MHz. The encoding and decoding maps were generated from the following formulas:

$$Code_N = Round\left\{2^{N-1} + 2^N \cdot g \cdot \frac{|x|}{x} \cdot \log_e\left(\frac{|x|}{\alpha} + 1\right)\right\}, \quad (1)$$

where $$g = \left[2 \cdot \log\left(\frac{1}{2\alpha} + 1\right)\right]^{-1}; \text{ and} \quad (2)$$

$$x = \frac{Code_M}{2^M} - \frac{1}{2}. \quad (3)$$

$$Code_M = Round\left\{2^{M-1} + 2^M \cdot \alpha \cdot \frac{|y|}{y} \cdot \left[\exp\left(\frac{|y|}{g}\right) - 1\right]\right\}, \quad (1)$$

where $$g = \left[2 \cdot \log\left(\frac{1}{2\alpha} + 1\right)\right]^{-1}; \text{ and} \quad (2)$$

$$y = \frac{Code_N}{2^N} - \frac{1}{2}. \quad (3)$$

$Code_M$ is the M-bit word produced by the A/D converter 15 of the transmitting station 65, $Code_N$ is the N-bit word that is transported via the transport channel 35, and $\alpha$ is the adjustable parameter that was used to optimize the mapping within the constraint that the M and N codes should be logarithmically related. Round{ } indicates that the value in brackets is rounded to the nearest integer. Tables 1 and 2 show several values that have been computed for the encoding and decoding maps generated according to formulas (1)–(6), above.

TABLE 1

Encoding calculations for a few selected codes. M = 12, N = 8,
α = 0.0325, g = 0.178805.

| Code$_M$ | x | Code$_N$ |
|---|---|---|
| 0 | −0.5 | 0 |
| 1 | −0.49976 | 0 |
| 20 | −0.49512 | 0 |
| 2035 | −0.00317 | 124 |
| 2048 | 0 | 128 |
| 2049 | 0.000244 | 128 |
| 2085 | 0.009033 | 139 |

TABLE 2

Decoding calculations for a few selected codes. M = 12, N = 8,
α = 0.0325, g = 0.178805.

| Code$_N$ | y | Code$_M$ |
|---|---|---|
| 0 | −0.5 | 0 |
| 124 | −0.01563 | 2036 |
| 128 | 0 | 2048 |
| 139 | 0.042969 | 2084 |

It will be appreciated that decoding and encoding maps could be generated using formulas different from those set forth above in Formulas (1)–(6), as long as such alternative formulas map employ a greater number of codes to represent regions of the analog signal in which the majority of converter samples occur and a lesser number of codes to represent regions of the analog signal in which fewer samples occur.

More specifically, in a broadband communication system in which data is transmitted, a large number of correlated signals are transmitted over an already crowded communication medium, e.g., fiber optic cable or coaxial cable. As a result, the signal distribution is Gaussian, and the majority of samples are taken at the upper regions of the bell-shaped curve. The encoding and decoding maps used in accordance with the present invention should therefore map a greater number of codes for samples taken near the upper regions of the curve and a lesser number of codes for sample taken at the tails of the curve.

In this manned, higher resolution digital signals will be sent, and quantization error reduced, for signals corresponding to the "high probability" areas of the distribution curve, i.e., the regions in which the majority of the sampled signals fall, and lower resolution digital signals will be sent for signals corresponding to the "lower probability" areas of the distribution curve, i.e., the regions in which few sampled signals fall. As a consequence, the communication channel is used more efficiently, yet transmissions are more reliable.

Figure 2:
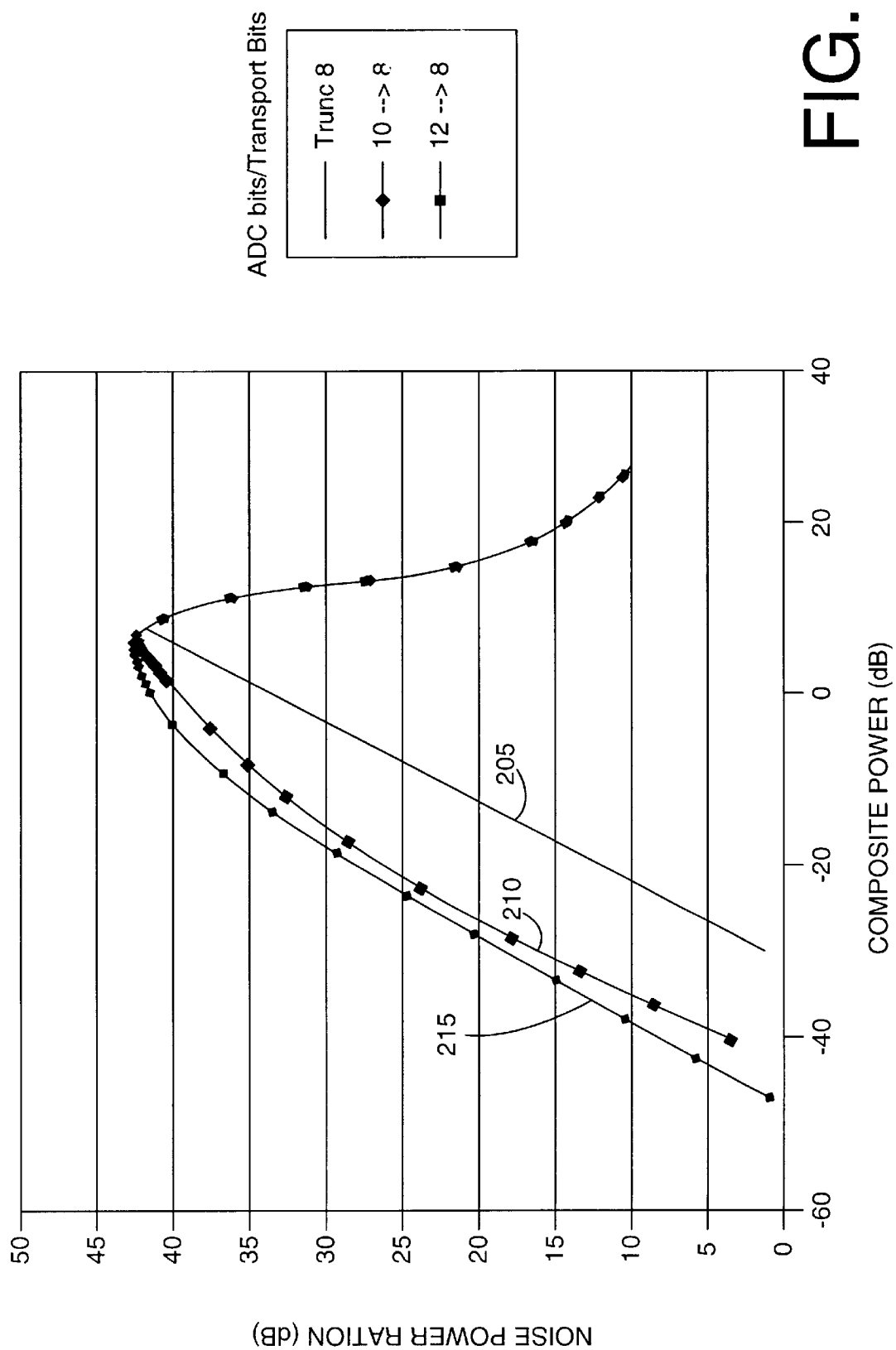
FIG. 2 is a graph comparing the noise power ratio for the prior art simple truncation method to the values obtained with the encoding map method of the present invention.

FIG. 2 shows a graph in which the noise power ratio (NPR) is plotted on the vertical axis as a function of the composite input signal power for three different cases. The linear curve 205 describes the performance of a system with a 12-bit A/D converter having an output that is truncated to 8 bits for transport. The second curve 210 shows the NPR for a system in which the output of a 10-bit A/D converter is reduced to 8 bits using the method and apparatus of the current invention and the equations above with α=0.0325. The third curve 215 describes the performance of a system in which the output of a 12-bit A/D converter is reduced to 8 bits using the same encoding and decoding maps with α=0.0325. Table 3 summarizes the dynamic range for each of the three curves.

TABLE 3

Dynamic range for curves.

| Curve Label | Dynamic Range at NPR = 40 |
|---|---|
| Trunc 8 | 3.8 dB |
| 10 → 8 | 8.8 dB |
| 12 → 8 | 12.6 dB |

The systems that encode and decode in accordance with the present invention significantly outperformed the system using the prior art truncation technique with respect to dynamic range at an NPR of 40 dB. The values of 8.8 dB for the 10-bit A/D converter and 12.6 dB for the 12-bit A/D converter are significantly greater than the 3.8 dB dynamic range of the system in which the 12-bit A/D converter output was truncated to 8 bits.

It is anticipated that systems of the type shown in FIGS. 1 will find application in the reverse path of a broadband communication system, such as a cable television distribution network, and in a wide range of storage applications in which an analog signal must be digitized and transported. In each case, systems configured in accordance with the present invention are expected to offer improved performance with little increase in overall system cost.

What is claimed is:

1. A broadband communication system, comprising:
 a transmitting station that receives a first broadband signal having a Gaussian distribution, converts the first broadband signal to a first digital signal having a first number of bits, encodes the first digital signal to generate a second digital signal having a second number of bits less than the first number of bits, then optically transmits the second digital signal,
 wherein encoding calculations send higher resolution digital signals for signals located in high probability areas of the Gaussian distribution, and wherein encoding calculations send lower resolution digital signals for signals located in lower probability areas of the Gaussian distribution; and
 a receiving station that receives the second digital signal, decodes the second digital signal to generate a third digital signal having a third number of bits greater than the second number of bits, then converts the third digital signal to a second broadband signal that approximates the first broadband signal.

2. The communication system of claim 1, wherein the transmitting station comprises:
 an analog-to-digital (A/D) converter for converting the first broadband signal to the first digital signal;
 an encoder for encoding the first digital signal in accordance with an encoding map to generate the second digital signal,
 wherein the encoding map is determined by the encoding calculations, and wherein the encoding calculations dynamically match the first broadband signal with an amplitude probability function of the first broadband signal and remove bits from the first digital signal in accordance therewith; and
 a transmitter for transmitting the second digital signal.

3. The communication system of claim 2, wherein the receiving station comprises:
 a receiver for receiving the second digital signal;
 a decoder for decoding the second digital signal in accordance with a decoding map to generate the third digital signal, wherein the decoding map is determined by decoding calculations; and a digital-to-analog (D/A) converter for converting the third digital signal to the second broadband signal.

4. The communication system of claim 3, wherein the first number of bits included in the first digital signal is equal to the third number of bits included in the third digital signal.

5. The communication system of claim 3, wherein the first number of bits included in the first digital signal is not equal to the third number of bits included in the third digital signal.

6. The communication system of claim 3, wherein the transmitter of the transmitting station receives a first electrical signal that is converted to a digital optical signal for transmission.

7. The communication system of claim 6, wherein the receiver of the receiving station receives the digital optical signal and converts it to a second electrical signal.

8. A broadband communication system, comprising:

a transmitting station for receiving a first analog signal and transmitting an optical signal, the transmitting station including:

an analog-to-digital (A/D) converter for converting the first analog signal to a first digital signal having a first number of bits;

an encoder for encoding the first digital signal to generate a second digital signal having a second number of bits less than the first number of bits, wherein the encoder encodes according to an encoding map, and wherein the encoding map is determined by encoding calculations that reduces the re-quantization error for frequently transmitted amplitudes of the first analog signal by removing rarely transmitted bits of the first analog signal;

a transmitter for transmitting the second digital signal as the optical signal; and a receiving station for processing the optical signal, the receiving station including:

a receiver for receiving the second digital signal;

a decoder for decoding the second digital signal to generate a third digital signal having a third number of bits greater than the second number of bits; and a digital-to-analog (D/A) converter for converting the third digital signal to a second analog signal that approximates the first analog signal.

9. The broadband communication system of claim 8, further comprising:

an optical communication channel for coupling the transmitting station and the receiving station.

10. The broadband communication system of claim 9, wherein the first number of bits included in the first digital signal is equal to the third number of bits included in the third digital signal.

11. The broadband communication system of claim 9, wherein the first number of bits included in the first digital signal is not equal to the third number of bits included in the third digital signal.

* * * * *

UNITED STATES PATENT AND TRADEMARK OFFICE
CERTIFICATE OF CORRECTION

PATENT NO. : 6,417,949 B1
DATED : July 9, 2002
INVENTOR(S) : Farhan et al.

It is certified that error appears in the above-identified patent and that said Letters Patent is hereby corrected as shown below:

Column 4,
Line 32, insert therefore -- Encoding Map Formulas: --
Line 45, insert therefore -- Decoding Map Formulas: --

Column 5,
Line 35, delete "correlated" and insert therefore -- uncorrelated --
Line 43, delete "sample" and insert therefore -- samples --
Line 45, delete "manned," and insert therefore -- manner, --

Signed and Sealed this

Twenty-ninth Day of October, 2002

*Attest:*

*Attesting Officer*

JAMES E. ROGAN
*Director of the United States Patent and Trademark Office*